US006305551B1

(12) United States Patent
Ruymen

(10) Patent No.: US 6,305,551 B1
(45) Date of Patent: Oct. 23, 2001

(54) SORTING APPARATUS

(76) Inventor: Marc Ruymen, Bierbeekstraat 103, B-3360 Korbeek-Lo (BE)

( * ) Notice: Subject to any disclaimer, the term of this patent is extended or adjusted under 35 U.S.C. 154(b) by 0 days.

(21) Appl. No.: 09/341,753

(22) PCT Filed: Jan. 15, 1998

(86) PCT No.: PCT/BE98/00005

§ 371 Date: Jul. 16, 1999

§ 102(e) Date: Jul. 16, 1999

(87) PCT Pub. No.: WO98/31477

PCT Pub. Date: Jul. 23, 1998

(30) Foreign Application Priority Data

Jan. 17, 1997 (BE) .................................................. 9700055

(51) Int. Cl.[7] .............................. B07C 5/00; B65G 11/00

(52) U.S. Cl. .......................... 209/644; 209/642; 209/579; 193/7

(58) Field of Search .................................... 209/579, 641, 209/642, 644, 932, 938; 193/7, 32, 33, 34, 2 R

(56) References Cited

U.S. PATENT DOCUMENTS 3,651,910 * 3/1972 Buschbom ............................. 193/34
4,373,638 * 2/1983 Schapper ............................. 209/642
4,889,241 * 12/1989 Cogan et al. ........................ 193/2 R
5,339,965 * 8/1994 Klukis et al. ........................ 209/644
5,538,142 * 7/1996 Davis et al. ......................... 209/938
5,638,961 * 6/1997 Satake et al. ........................ 209/644
5,862,919 * 1/1999 Eason .................................. 209/644
6,013,887 * 1/2000 Satake et al. ........................ 209/938
6,100,488 * 8/2000 Satake et al. ........................ 209/644

FOREIGN PATENT DOCUMENTS 0 418 389 3/1991 (EP) .
0 443 769 8/1991 (EP) .
2 067 924 8/1981 (GB) .

* cited by examiner

*Primary Examiner*—Katherine A. Matecki
(74) *Attorney, Agent, or Firm*—Browdy and Neimark

(57) ABSTRACT

The invention concerns a sorting apparatus for granular products (7, 8), such as peas, nuts, raisins, and suchlike, with a detection system (3), a removal system (4) and a transport device (1), where the latter has a sloping distribution surface (1') over which said products (7, 8) are moved, whereby said surface (1') is convex over at least a certain distance in the direction of travel (10) of said products (7, 8), such that said surface (1') has a curvature in the direction of fall of said products (7, 8) equal to or slightly less than that of the path (9) which the products would follow at said surface (1') in free fall, independent of said surface (1').

16 Claims, 3 Drawing Sheets

SORTING APPARATUS

CROSS REFERENCE TO RELATED APPLICATION

The present application is the national stage under 35 U.S.C. 371 of PCT/BE98/00005, filed Jan. 15, 1999.

BACKGROUND OF THE INVENTION

The invention concerns a sorting apparatus for granular products, such as peas, nuts, raisins and suchlike, with a detection system, a removal system and a transport device, where said transport device is characterised by a sloping distribution surface over which said products are moved.

In existing sorting apparatuses, serious problems can arise with separating off low-quality products and foreign bodies from the continuous stream of products, mainly due to the irregularity of said stream of products.

This results in significant quantities of foreign bodies or low-quality products not being removed from the stream of products.

Canadian patent 1 158 748 describes a sorting apparatus for radioactive ores, in which said ores are moved over a curved plate. Said plate is equipped with channels through which the ores are guided towards a detection system. Said channels ensure that the ores do not move across the width of the plate, so preventing them falling outside the range of the detector. The use of such channels has the disadvantageous consequence that only a limited capacity or flow rate of products to be sorted can be handled. Also, the construction of a plate with several channels extending alongside each other is complex and expensive, due to the plate being curved. Furthermore, the shape of said curved plate is such that, in order to permit detection, it is also necessary to carry out a speed measurement or separate determination of the position of the products to be sorted, with the help of extra sensors, which increases the complexity of the apparatus and the risk of inaccuracies in its operation.

BRIEF SUMMARY OF THE INVENTION

The invention intends to overcome this and other disadvantages, by proposing a transport device which enables substantially all low -quality products and foreign bodies to be removed from the product stream in an efficient, fast and extremely accurate way, so that a high- quality product is obtained, with the loss of good products being minimal. Thus according to the invention, no extra position determination or speed determination for each product has to be carried out in the transport device, and furthermore the construction of said transport device is extremely simple, permitting it to process a higher flow rate of products to be sorted.

To this end, said surface is convex over at least a certain distance, according to the direction of travel of said products, such that said surface has a curvature in the direction of fall of the products concerned, where said curvature is equal to or slightly smaller than that of the path which the products should follow at said surface, in free fall, independently of the surface.

Advantageously, said curved surface has a decreasing curvature in the downwards direction.

In a particular embodiment of the sorting apparatus according to the invention, the apparatus has means for adjusting the curvature of said curved surface to match the type of aforementioned products.

In a specific embodiment of the sorting apparatus according to the invention, said surface is a curved plate.

The invention also concerns the transport device itself, which can possibly be used in other applications.

Other characteristics and advantages of the invention will be apparent from the following description of a specific embodiment of the sorting apparatus and transport device according to the invention; this description is given by way of example only and does not limit the scope of the protection claimed; the figures used below refer to the attached drawings.

BRIEF DESCRIPTION OF THE DRAWINGS

In the various drawings, the same reference numbers refer to the same parts.

DETAILED DESCRIPTION OF THE INVENTION

According to the present state of the art, products which, for example, have to be sorted in order to remove low-quality products or foreign bodies, are routed over a straight, downward-sloping plate. When the products have substantially just left the plate, the low-quality products or foreign bodies are removed from the product stream with the help of a detection system, that comprises, among other things, a camera, and subsequently a removal system, for example a compressed air device.

When sorting the products, these are first individually inspected with the help of said camera, and subsequently removed from the product stream by means of, for example, said compressed air device whenever they do not meet the prescribed standards or requirements. The compressed air device is equipped with compressed air valves with corresponding nozzles, which enable a product or foreign body to be blown out of the product stream whenever such a valve is opened. It is therefore important to know the correct position and speed of each product whenever it passes through the zone where the detection system detects it, so that the correct time and correct position can be determined when a product being examined is located at the aforementioned nozzles in order for it to be possibly removed. When the separated products do not follow congruent paths, so that when leaving the plate they do not, for example, move to a predetermined distance from said removal system, and thus the speed and position of the products varies too much, it frequently happens that a low-quality product or a foreign body that is detected by said detection system cannot be subsequently removed from the product flow because its position with respect to the removal system is not correctly determined, and so the wrong compressed air valve is opened, or a compressed air valve is opened at the wrong moment.

For most products, it has been found that when using a straight plate, it is unavoidable that the majority of the products dance across said plate in an uncontrolled and irregular manner, and thus do not have paths that are congruent to each other, so that the aforementioned disadvantages occur. This particularly applies to foreign bodies that have to be removed, such as small stones.

Figure 1:
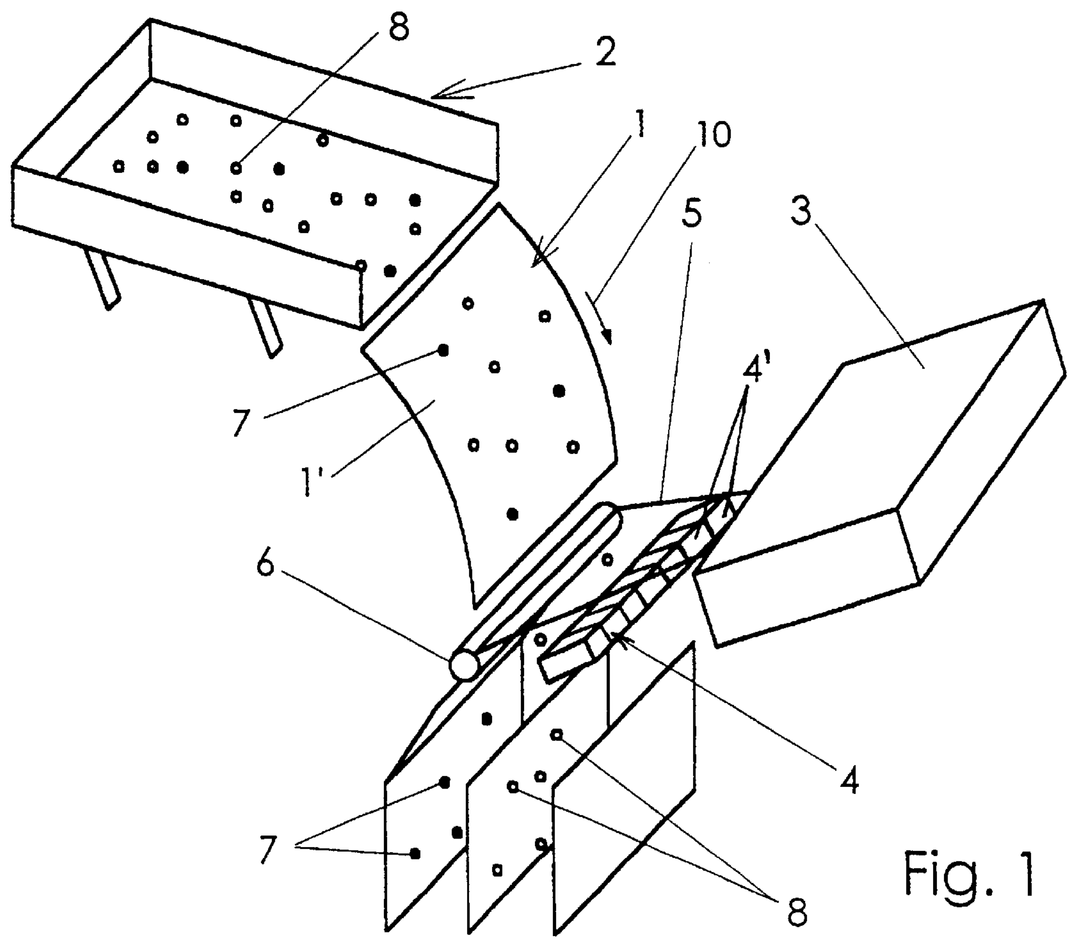
FIG. 1 is a schematic perspective view of a sorting apparatus equipped with a transport device according to this specific embodiment of the invention.

The sorting apparatus according to the invention comprises, as shown in FIG. 1, in addition to a detection system 3, a compressed air device 4 with a series of valves with nozzles 4' and a transport device 1 supplied from a so-called vibrating table 2 on which granular products, such as, for example, peas, nuts or raisins, are carried along. These products are routed by the vibrating table 2 to the transport device 1 with a downward sloping surface 1', on which they come up with a speed having a certain horizontal component.

The surface 1' is completely smooth, without any channels or grooves in the direction of travel of the products to be sorted. Because of the special shape of the surface 1', the products to be sorted travel substantially according to paths in substantially the same way as would be the case if surface 1' were to be subdivided into channels parallel with each other.

Said transport device 1 ensures that the products are routed opposite the detection system 3 and the compressed air device 4, said compressed air device being located lower down. In order to permit effective interaction between said detection system 3 and the compressed air device 4, it has been determined that it is necessary for said products to move along a known path with a known speed curve opposite both of said devices 3 and 4.

Accordingly, the time interval, necessary for the products to travel between the zone in which they are detected by the detection system 3 and the zone opposite the aforementioned nozzles 4', should preferably be substantially constant.

The distance in the direction of movement 10 of the products between the detection system 3 and the compressed air device 4 is generally between 20 and 150 mm, and should preferably be approximately 70 mm.

The detection system 3 can possibly also interact with a reference device 6, generating one or more laser beam 5 that move rapidly over the width of the product stream, thereby examining whether foreign bodies or low-quality products 7 are contained in the product stream. If such a body or product 7 is detected, a signal is passed to said compressed air device 4, which subsequently blows said body or product 7 out of the product stream, by activating one or more compressed air valves 4' at the correct moment. It is therefore important that each of the bodies or products, located opposite the detection system 3 and the ompressed air device 4, all follow paths congruent to each other, or at least paths hat can be determined beforehand, said paths extending in a direction substantially parallel to the aforementioned surface 1'. The products 7 and 8 should preferably have a constant, or almost constant, speed curve in the zone between the detection system 3 and the removal system 4.

If this is not the case, a detected foreign body 7 may not be removed, which can result in a low-quality end product.

Accordingly, the transport device according to the invention, ensures that the products 7, 8 opposite said detection system 3 and opposite said compressed air device 4 all have a known position and preferably substantially the same speed curve. The downward-sloping surface 1' of the transport device 1 also ensures that the products 7 and 8, which are moved over this device 1, leave said device 1 in a single layer with substantially a thickness of only one product, with a limited distribution.

In order to prevent the products supplied from dancing over said surface during their downwards movement, or in other words, dancing up and down in an uncontrolled manner, according to the invention, the surface 1' is convex over at least a certain distance in the direction of travel 10 of said products 7 and 8.

The surface 1' is preferably curved in a convex manner over the whole length, as shown in the drawings.

Said surface 1' has a curvature that approximates as closely as possible to the free falling movement of the products 7 and 8, such that during their downwards movement, said products are guided as much as possible by the surface 1' without the aforementioned dancing movement occurring.

The contact pressure between the products 7 and 8 and said surface 1' is reduced by the convex shape, so that there is less braking of the products 7 and 8 due to friction than would be the case with a straight surface. The objective is to ensure that the speed resultant during the downwards movement of the products at each point remains as tangential as possible to the surface 1'. The curvature of the surface 1'in the direction of travel 10 of the products 7 and 8 is therefore equal to, or preferably slightly less than, the path that the products would follow at said surface 1' in free fall, independent of said surface 1'.

Figure 2:
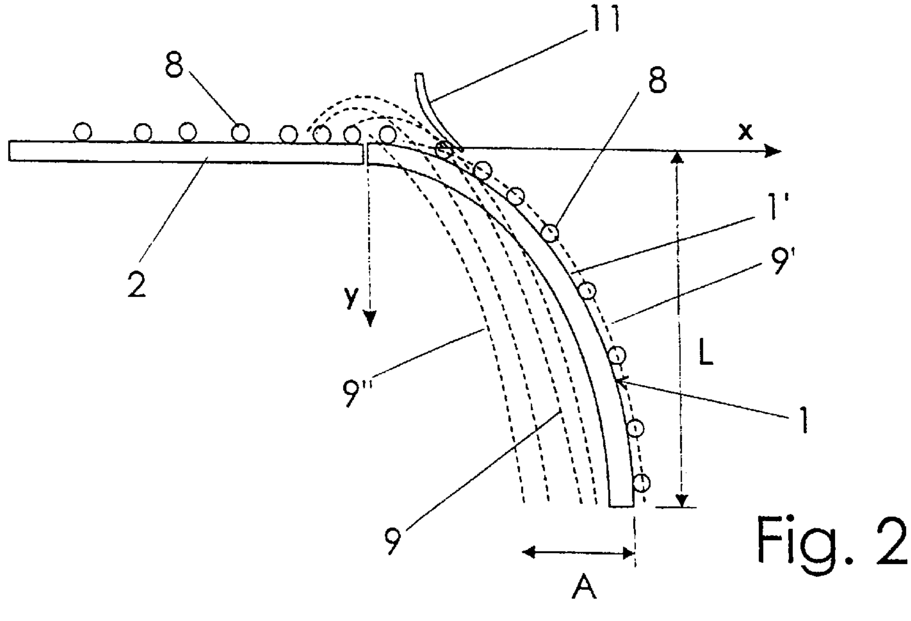
FIG. 2 is a schematic side view of said transport device and a vibrating table.

In FIG. 2, the transport apparatus 1 of the sorting device according to FIG. 1 is shown together with a vibrating table 2. The paths 9 which the products supplied by the vibrating table would follow independently of the transport device 1, i.e. in the absence of the latter, in other words in free fall, is shown by a dotted line. The paths 9 therefore each have a parabolic trajectory, in which each product 7 or 8 has a differently oriented initial speed as a result of the vibrating movement of the vibrating table 2. As can be seen from FIG. 2, in the absence of transport device 1, there would therefore be a certain distribution in the thickness perpendicular to the direction of movement 10 of the product stream. The surface 1' of the transport device 1 helps to prevent this, since it has a curvature that substantially coincides with, or is smaller than most of the vertically displaced path 9', so that when leaving said surface 1', the products 7 and 8 are forced to form a stream of products with a thickness substantially equal to the thickness of a product 7, 8, with a very small distribution in a direction perpendicular to said surface 1'.

In an advantageous embodiment of the invention, said transport device 1 essentially comprises a curved plate with a length L of for example 0.5 m, which at its bottom edge has a horizontal deviation over distance A from the path 9" with the steepest slope. The distance A should preferably be between 5 and 18 cm, and more specifically is substantially 12 cm. This enables contact to be ensured between each product 7, 8 and the surface 1' in a continuous manner during the downwards movement, without a dancing movement being able to occur. As shown in FIG. 2, the products supplied by the aforementioned vibrating table 2 can each have a different initial speed, in particular as regards orientation, as shown in FIG. 2. The surface 1' therefore has to ensure that when these products 7, 8 leave said surface 1', they all have the same, or at least a predetermined, speed and direction of travel 10, and move at a known point through the zone where they are examined by the aforementioned detection system 3, and are possibly removed by the aforementioned compressed air device 4.

The surface 1' accordingly has a decreasing curvature in the downwards direction.

In this way, at least 95% or more specifically at least 99.5% of the products 7, 8 are routed in a substantially continuous way over said surface 1'.

In a preferred embodiment of the transport device 1, according to the invention, in the direction of movement 10 of the products, the curved surface has at least partly, substantially the shape of a third-degree curve corresponding to the following equation: $y=cx+dx^2+ex^3$, with x and y being the displacement of the product in respectively the horizontal and vertical direction.

In a particular embodiment of the transport device 1, according to the invention, the latter comprises well-known means for adjusting the curvature of the surface 1' to match the type of products 7, 8 and the average speed with which said products 7, 8 come in contact with said surface 1'. In this way, using said means, the curvature can be constantly adjusted so that the products 7, 8 continually touch said surface 1' tangentially during their downwards movement, as already described above.

The surface 1' of the transport device 1 consists preferably of a curved plate. Said means comprise adjustable supports for this plate, for example, screw jacks. For the sake of clarity, such means are not shown in the figures.

Further, said plate, or at least the convex surface 1' of same, is usually manufactured from stainless steel, plastic such as Teflon®, polycarbonate, coated steel that has low adhesion and friction with the products to be sorted, as used, among other things, for frying pans of the "Tefal®" brand, or other materials.

Above the aforementioned vibrating table 2 is a slightly flexible flap 11 which is mounted around a horizontal axis and which, for example, consists of a piece of rubber, leather or plastic. Said axis is located above the end of the vibrating table 2 that ends at said surface 1' and is perpendicular to the direction of travel 10 of the products 7, 8. In this way, the products 7, 8 moving from the vibrating table 2 to the transport device 1, press against said flap 11 so that the latter is pushed slightly upwards, and lets products through to said surface 1' without them having too high a speed. For the sake of clarity, the flap 11 is not shown in FIG. 1.

In certain cases, where the products to be sorted consist of slightly sticky material, such as certain types of raisins, it is possible to use a transport device 1 with a substantially straight surface 1' that has a slope angle in relation to the horizontal of between 50° and 85°, more specifically of the order of 70°.

To further illustrate the invention, a specific example is given of the shape of a curved surface 1' which can preferably be used in a sorting apparatus for peas and similar products as regards weight, shape and dimensions.

In order to maintain a limited contact pressure between the products and the curved surface, a small horizontal acceleration a is imposed to the products by adjusting the curvature of the surface 1' so that the latter is smaller than the curvature of a parabolic falling trajectory.

For a falling trajectory of a product with a horizontal initial speed of $v_{ox}$ and a falling acceleration of $g=9.81\ m/s^2$, where t represents time, $x=v_{ox}\cdot t$ and $y=(g/2)\cdot t^2$ When said small horizontal acceleration a is imposed, then by approximation $x=v_{ox}\cdot t+(a/2)\cdot t^2$ and $y=(g/2)t^2$ After eliminating t, $x=\sqrt{2/g}\cdot v_{ox}\cdot\sqrt{y}+a/g\cdot y$.

The acceleration a can possibly decrease when the product moves downwards, so that the horizontal acceleration is substantially equal to zero at the lowermost end of said surface.

Supposing $a=a_0-k\cdot t$, then $x=v_{ox}\cdot\sqrt{2/g}\cdot\sqrt{y}+a_0/g\cdot y-k/6\cdot(2/gy)^{3/2}$.

In this case, y varies for example from 0 to 0.45 m, and for example $v_{ox}=0.2\ m/s$, $g=9.81\ m/s^3$, $a_o=2\ m/s^2$ and $k=3\ m/s^3$.

In this way, the curve for the surface and the path of the products that move over it, can be approximated by a third-degree equation of the form $y=c\cdot x+d\cdot x^2+e\cdot x^3$, where c, d and e are constants.

In general, the surface 1' preferably has dimensions and a shape such that the height of fall of the products varies from 0.1 m to 1.2 m, where for example $v_{ox}$ can vary from 0.05 to 0.8 m/s, g from 7 to 10 $m/s^2$, a from 0.5 to 6 $m/s^3$, and k from 0.1 to 10 $m/s^3$. More particularly, a can be between 2 and 4 $m/s^2$ and k can be between 4 and 6 $m/s^2$.

In a preferred embodiment of the transport device of the sorting apparatus, according to the invention, the above equation can be represented in the following way:

$$x=\sqrt{y}(\alpha+\sqrt{y}(\beta-\gamma\sqrt{y})),$$

with $\alpha=0{,}183533$, $\beta=0{,}210526$ and $\gamma=0{,}064397$.

The invention is of course not limited to the embodiment of a sorting apparatus equipped with a transport device according to the invention as described above and shown in the accompanying drawings. For example, the upper part of the plate can be flat, and can then gradually assume a convex shape downwards, ending in a short, substantially vertical flat part.

Figure 3:
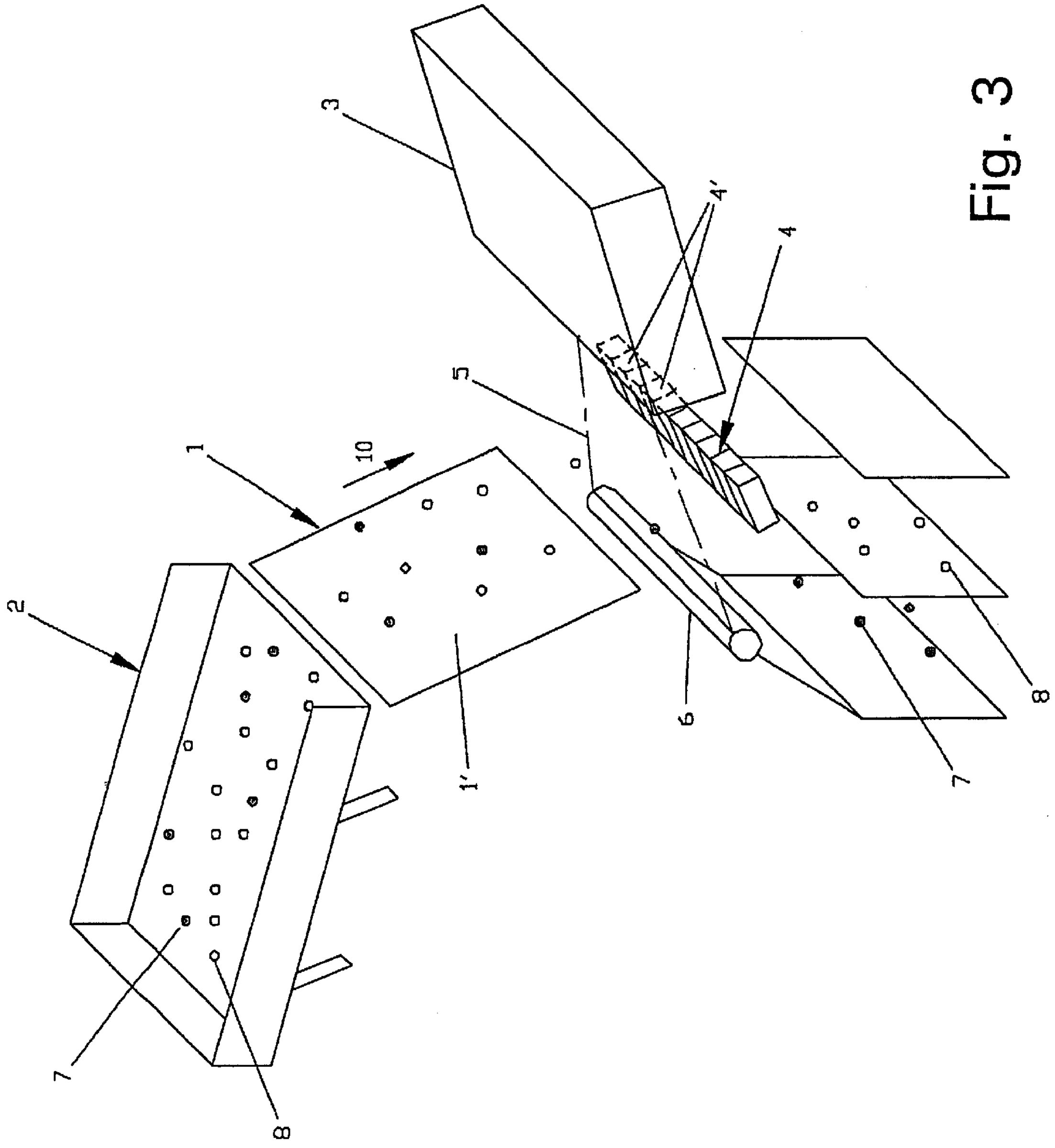
FIG. 3 is a view similar to that of FIG. 1 of a sorting apparatus equipped with a transport device according to a second embodiment of the invention.
Figure 4:
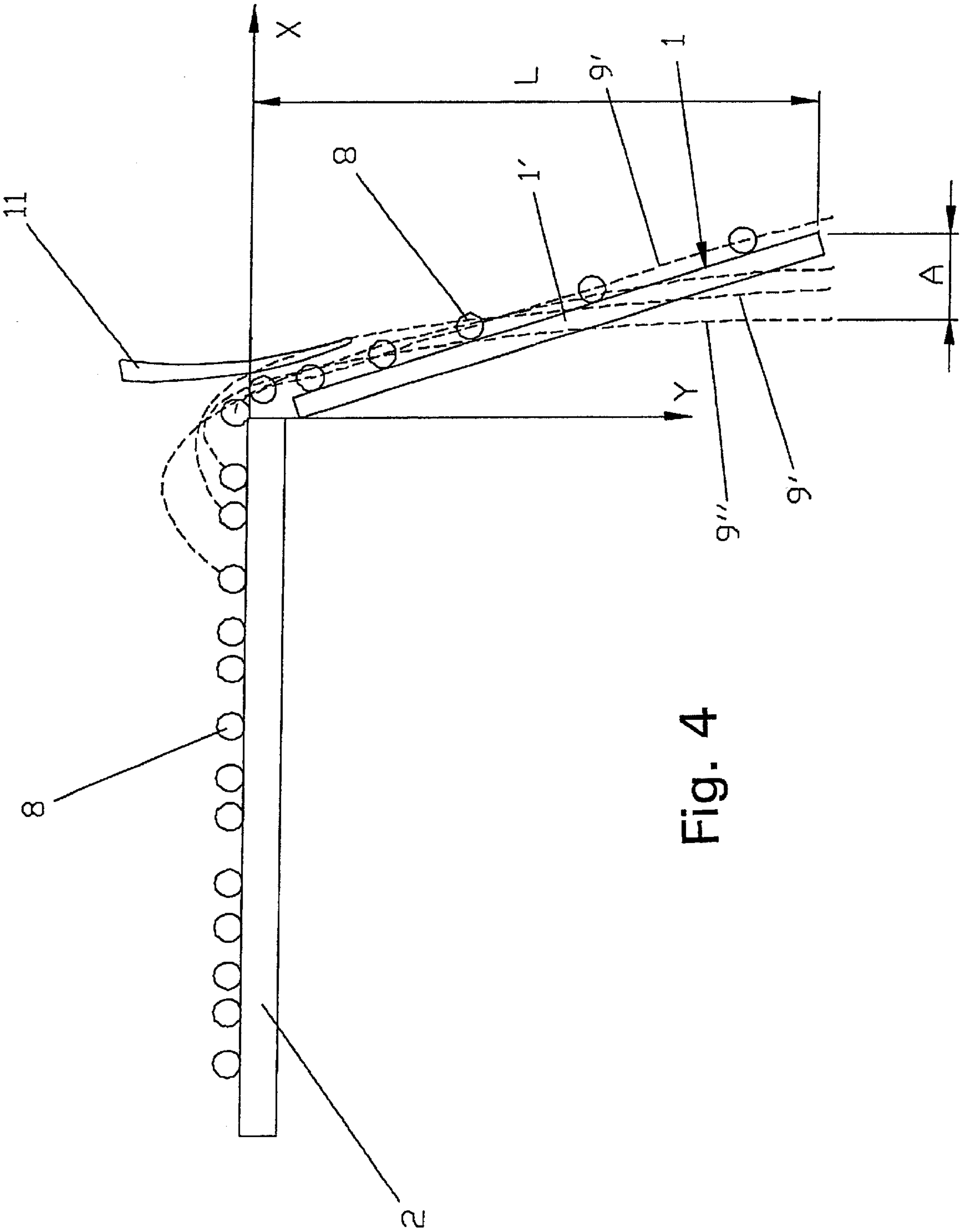
FIG. 4 is a view similar to that of FIG. 2 of the transport device of FIG. 3.

FIGS. 3 and 4 illustrate an embodiment in which surface 1' is flat.

The sorting apparatus with the transport device according to the invention is also used for products such as potatoes, carrots, cauliflowers, deep-frozen vegetables or fruit, rice, dried fruits, coffee beans, etc.

The vertical distance between the bottom edge and the top edge of the surface 1' can for example vary between 0.1 and 1.2 m, but is preferably between 0.2 and 0.6 m. This relatively limited distance L makes it possible to construct a very compact sorting apparatus in comparison with existing sorting apparatuses, which for example use a conveyor belt.

Instead of a compressed air device, the removal system can comprise another type of device, for example mechanically-operated flaps by means of which foreign bodies or low-quality products can be removed from the stream of products by moving a flap.

The aforementioned detection system preferably comprises a laser beam which travels transversely across the product stream, but can also comprise a video camera or suchlike.

The aforementioned vibrating table can be replaced by a conveyor belt or another means that enables for the aforementioned products to be brought onto the transport device-.according to the invention.

What is claimed is:

1. Sorting apparatus for granular products (7,8) comprising a removal system (4), for eliminating foreign bodies or low-quality products (7) contained in a product stream having a width, a transport device (1) having a sloping distribution surface (1') over which said products (7,8) are moved in a direction of travel, and a detection system (3) following said surface, said detection system comprising a laser beam (5) that moves over the width of the product stream, wherein said surface (1') is convex in the direction of travel (10) of said products (7,8) such that said surface (1') has a curvature in the travel direction slightly less than that of the path (9) which the products would follow in free fall, independent of said surface (1').

2. Sorting apparatus according to claim 1, wherein said curved surface (1') has a decreasing curvature in the downwards direction.

3. Sorting apparatus according to claim 1, wherein said curved surface (1'), in the direction of movement (10) of said products (7, 8), has a length of between 0.1 m and 1.2 m, more specifically between 0.2 and 0.6 m, and preferably 0.4 m.

4. Sorting apparatus according to claim 3 wherein said curved surface, in the direction of movement of said products, has a length of between 0.2 and 0.6 m.

5. Sorting apparatus according to claim 1, wherein said curved surface (1') has a horizontal deviation of between preferably 5 and 18 cm, from the path (9") with the greatest slope which said products (7, 8) would describe in free fall, independent from said transport device (1).

6. Sorting apparatus according to claim 5 wherein said curved surface has a horizontal deviation of approximately 12 cm.

7. Sorting apparatus according to one of claim 1, wherein it comprises means for adjusting said curved surface (1') to match the type of said products (7, 8).

8. Sorting apparatus according to claim 7, wherein said means comprises adjustable supports for the plate.

9. Sorting apparatus according to one of claim 1, wherein said surface (1') is a curved plate.

10. Sorting apparatus according to one of claim 1, wherein said laser beam moves across the width of the stream of products (7, 8) and interacts with a reference device (6).

11. Sorting apparatus according to one of claim 1, wherein a preferably flexible flap (11) is mounted on a horizontal axis such that the products (7, 8) to be sorted are routed through said flap (11) to the surface (1') of the transport device (1), where said flap (11) is made of rubber, leather or plastic.

12. Sorting apparatus according to one of claim 1, wherein said surface (1') is manufactured from steel, stainless steel, coated steel that has very low adhesion and friction with the products to be sorted, PTFE, polycarbonate.

13. Sorting apparatus according to claim 1 wherein said curved surface (1'), in the direction of travel (10) of the products has a form corresponding to the following equation:

$$x=v_{ox}\cdot\sqrt{2/g}\cdot\sqrt{y}+a_o/g\cdot y-k/6\cdot(2/gy)^{3/2}$$

where $v_{ox}$ is the initial horizontal speed of the products, g is the acceleration of an object caused by gravity, x and y are the horizontal and vertical coordinates, respectively, of the position of a product, and $a_o$ is the initial horizontal acceleration of the products.

14. Sorting apparatus for sticky, granular products (7, 8), comprising a detection system (3), a removal system (4) and a transport device (1), where the latter has a sloping distribution surface (1') over which said products (7, 8) are moved, wherein said surface (1') is straight and has an angle of slope which is preferably between 50° and 85°, where said detection system (3) has a device for producing at least one laser beam which moves across the width of the stream of products (7, 8).

15. Sorting apparatus according to claim 14, wherein a flexible flap (11) is mounted on a horizontal axis such that the products (7, 8) to be sorted are routed through said flap (11) to the surface (1') of the transport device (1), where said flap (11) is manufactured from rubber, leather or plastic.

16. Sorting apparatus according to claim 14, wherein said surface (1') is manufactured from steel, stainless steel, coated steel that has very low adhesion and friction with the products to be sorted, PTFE, or a polycarbonate.

* * * * *